Oct. 14, 1941.    E. H. VEDDER    2,259,331
PROTECTIVE SYSTEM FOR GASEOUS DISCHARGE DEVICES
Filed Aug. 25, 1938
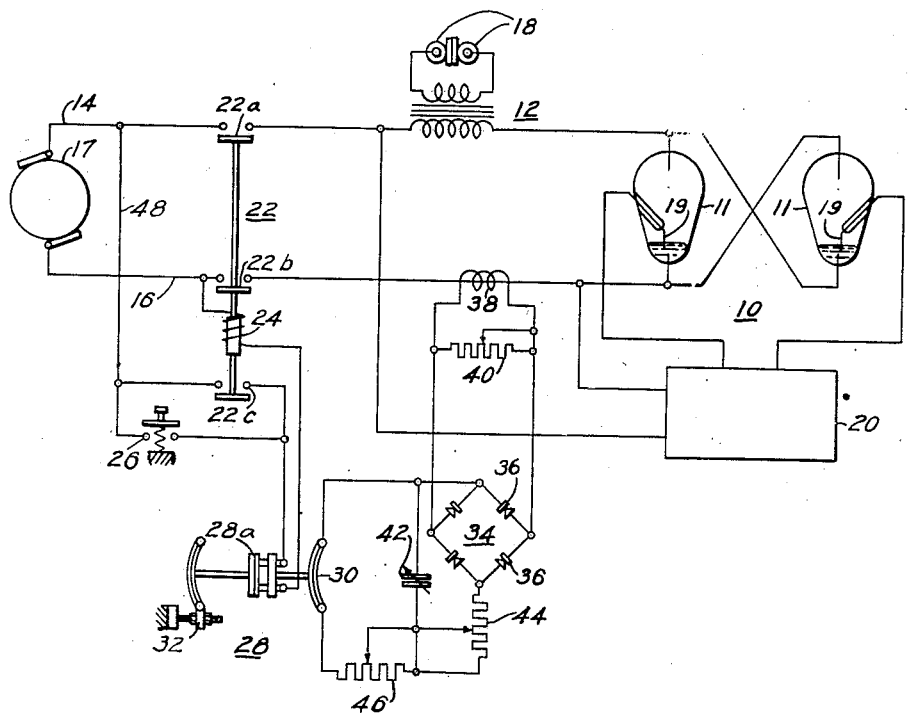
WITNESSES:
INVENTOR
Edwin H. Vedder.
BY
ATTORNEY Patented Oct. 14, 1941

2,259,331

UNITED STATES PATENT OFFICE 2,259,331

PROTECTIVE SYSTEM FOR GASEOUS DISCHARGE DEVICES

Edwin H. Vedder, Forest Hills, Pa., assignor to Westinghouse Electric & Manufacturing Company, East Pittsburgh, Pa., a corporation of Pennsylvania Application August 25, 1938, Serial No. 226,707

6 Claims. (Cl. 250—27)

My invention relates, generally, to protective systems, and it has particular reference to thermal protective systems for gaseous discharge devices, such, for example, as arc discharge tubes or valves and the like.

Gaseous or arc discharge devices have come into wide use in present-day control systems and in many instances they are subjected to such heavy and varying loads that overload protection of such devices becomes a serious problem. As the voltage drop in devices of the gaseous or arc discharge type is substantially constant under operating conditions, the heating effect of an alternating-current load on such a device will not be proportional to the effective or root mean square of the current, as it is in the case of a simple resistance, but will generally be proportional to the average value of the load current. Where the load is not continuous but is intermittent, the thermal capacity and the rate of cooling of the discharge device must be considered when providing overload protection, and the problem of properly protecting the discharge device from overload is further complicated.

The Ignitron valve, which comprises an anode, a mercury pool cathode, and a make-alive electrode positioned in a sealed casing, and which is rendered conductive by the application of a relatively small control potential to the make-alive electrode, is an example of a type of discharge device which is widely used for controlling the flow of alternating currents in spot and seam welding applications. In such applications, it is usually desirable to utilize momentary surges of welding current of relatively large value at repeated intervals. As valves of the Ignitron type have but a single anode, a single mercury pool cathode and a control make-alive electrode within the valve casing, the mercury arc may be permitted to become entirely extinguished following a period of conductivity, by deenergizing the make-alive electrode and allowing the arc to go out at the zero point in the current cycle. The valve will then remain non-conductive until the application of a suitable control potential to the make-alive electrode during an interval in the current cycle when the anode of the valve is at a positive potential, when the arc may be reestablished.

In most spot and seam welding applications, it is usually desirable to vary both the duration of the periods of conductivity of the valve, and also the duration of the intervals between such periods of conductivity. Ignitron valves are peculiarly suitable to such service as the duty cycle may readily be varied by suitably controlling the energization of the make-alive electrode, thus controlling the current flow so as to secure proper bonding between the members being welded under different conditions.

As the arc drop voltage of the valve remains substantially constant during the period of conductivity, it may be seen that the heating effects of the load current on Ignitron valves which may be operating under any of widely varying conditions, may also vary over a wide range. Under such circumstances, and in the case of many applications of other types of gaseous discharge devices, simple overload protection, such as afforded by fuses, which protect against momentary peaks only, or the usual type of thermal protection afforded by the use of thermally responsive devices positioned adjacent to the device being protected and operated by the heat therefrom, have been found inadequate. It is not so much the peak values of the current carried by the device which are likely to cause damage to the device, or the mere combination of the value of the current carried thereby and the duration of the period of conductivity, but rather the combined effects of the average current value, the duration of current flow and the frequency of the periods of energization, which must be taken into account when providing overload protection for Ignitron valves or other types of gaseous discharge devices which are used for controlling the flow of current in a load circuit. To properly protect the gaseous discharge devices, the protective system must be responsive to all these elements of overload and must be readily adaptable to use with devices having different thermal characteristics.

It is, therefore, generally an object of my invention to provide a simple and effective overload protective system for gaseous discharge devices.

A more specific object of my invention is to provide a thermally responsive overload protective system for gaseous or arc discharge devices which will be accurately responsive to the combined effects of the value of the load current and the load duty cycle of the gaseous or arc discharge device.

Another object of my invention is to utilize a thermally responsive switch in connection with an auxiliary control circuit of which the circuit constants may be varied to provide for effecting operation of the switch in accordance with thermal characteristics of different gaseous or arc discharge devices with which it may be used.

A further object of my invention is to connect a thermally responsive control switch in an auxiliary control circuit for effecting operation of the switch in accordance with the heating effects of a load on different types of gaseous or arc discharge devices.

Other objects will, in part, be obvious, and will, in part, appear hereinafter.

In practicing my invention overload protection for the gaseous or arc discharge devices may be provided by utilizing a thermally responsive control switch for disconnecting the devices from the source, preferably by connecting the heating element thereof to a control circuit, the circuit constants of which may be suitably varied, whereby the heating element may be energized so as to effect operation of the control switch both in accordance with the value of current in the load circuit, and in accordance with the heating effects of the load current on the gaseous or arc discharge device.

For a further understanding of the nature and scope of my invention, reference may be had to the following detailed description, taken in connection with the accompanying drawing, in which the single figure is a diagrammatic view of a thermal overload protective system embodying a preferred form of my invention.

While the invention has been disclosed in a form which may be applied to a welding system which utilizes Ignitron valves for controlling the flow of welding current, it is to be understood that the invention may be used with other types of gaseous or arc discharge devices in other kinds of systems to provide overload protection therefor under widely varying conditions. The reference numeral 10 of the drawing may denote, generally, a welding control utilizing Ignitron valves 11 of a type well known in the art, connected in inverse parallel relation in series circuit relation with the primary winding of a welding transformer 12 for effecting the connection thereof to the conductors 14 and 16 of a suitable source of alternating current power 17 for effecting control of the flow of current in the secondary winding, which may be connected to a welding circuit including electrodes 18. Energization of the Ignitron valves 11 may be effected by the application of timed impulses of control current to the make-alive electrodes 19 thereof, by a suitable timing control 20 of any type well known in the art.

In order to provide for the disconnection of the welding control 10 from the alternating-current power source upon the occurrence of such overload as would result in damage to the Ignitron valves, a control switch 22 may be utilized. As shown, the switch is provided with contact members 22a and 22b connected in series circuit relation between the welding control 10 and the supply conductors 14 and 16, respectively. The operating coil 24 of the control switch may be connected across the conductors 14 and 16 through the normally open contact members of a push button switch 26 and the normally closed contact members 28a of a thermal device 28, so that upon operation of the thermal device 28, the control switch 22 will operate to disconnect the welding control 10 from the source.

Auxiliary contact members 22c of the control switch 22 may be provided in shunt circuit relation with the normally open contact members of the push button switch 26 to provide a shunt holding circuit about the push button switch 26 for maintaining an energizing circuit for the operating coil 24 of the control switch 22, in order to retain the control switch 22 in the energized position after release of the push button switch 26.

The thermal device 28 may be of any suitable type, comprising, for example, a bimetallic contact actuating and heater member 30, which is disposed to be heated and actuated by the flow of current therethrough, and an associated adjustable bimetallic contact support member 32, for compensating for variations in ambient temperature and also providing for adjustment of the distance of travel required for opening contact members 28a. Operation of the thermal device 28 may be effected in accordance with the heating effect of the load carried by the Ignitron valves 11 by connecting the bimetallic member 30 to the direct-current terminals of a rectifier circuit 34 of any suitable form, such as the bridge connection of copper-oxide rectifier units 36, the alternating-current terminals of which are connected to the secondary winding of a current transformer 38, the primary winding of which may be connected in series circuit relation with the load circuit of the Ignitron valves. A control resistor 40 may be provided for varying the potential applied to the rectifier circuit 34 so as to provide adjustment for securing operation of the protective system at different values of overload.

By providing a suitable variable capacitor 42 in shunt circuit relation with the bimetallic member 30, connecting an adjustable charging resistor 44 in series circuit relation therewith for varying the charging rate of the condenser, and by further utilizing an adjustable current limiting resistor 46, the capacity, the charging rate and the rate of discharge of the condenser 42 may be independently varied. The wave form of each rectified current impulse from the transformer 38 and rectifier 34 may thus be modified, by reducing the peak value of the impulse and stretching out the base thereof, so as to produce more or less flat-topped impulses of current approaching in value the average rather than the usual root-mean-square value of the alternating current wave. The heating effects of the pulsating direct current applied to the bimetallic member 30 may thus be modified, and the control circuit may be adjusted so as to compensate for the rate of cooling of the particular valve in use, so that the heating effects of the current applied to the bimetallic member may be made comparable to the heating effects of the load current on the Ignitron valves in the welding control 10.

In operation, when the push button switch 26 is closed, the operating coil 24 of control switch 22 will be connected to the source 17 through conductor 14, conductor 48, push button switch 26, contact members 28a of the thermal device 28, operating coil 24 and conductor 16. Operation of the control switch 22 connects the welding control to the source through contact members 22a and 22b, while a shunt holding circuit for the operating coil 24 is established through auxiliary contact members 22c. When a welding operation is being performed, the rectifier circuit 34 will be energized from the current transformer 38, in accordance with the value of the welding current. By suitable adjustment of the charging resistance 44, condenser 42 and resistance 46, the rate of charge, the amount of the charge, and the rate of discharge of the condenser may be controlled, and the heating effects of the current flowing through the bimetallic contact actuating and heating member 30 so varied as to assimilate the thermal conditions of the Ignitron valves, so as to effect operation of the thermal device 28 when either the peak current value, the duty cycle of the welding operation, or the results of any combination thereof, may be such as to be dangerous to the continued operation of the Ignitron valves. Upon actuation of the bimetallic member 30, the energizing circuit for the operating coil 24 of the control switch 22 will be opened at contact member 28a which will cause the switch 22 to open and disconnect the welding control 10 from the source.

In this manner, the thermal device 28 may be effective to operate in accordance with the temperature and current conditions of the Ignitron valves in the welding control, which conditions, as hereinbefore set forth, are dependent not merely upon the effective or normal heating effect of the current in the welding circuit, but upon the combined effects of the average value of the welding current and the duty cycle under which the valves are operating. Proper overload protection will, therefore, be afforded by the simple and durable thermally responsive protective system of my invention, and the life of the Ignitron tubes thus protected may be greatly increased.

Since certain changes may be made in the above construction, and different embodiments of the invention may be made without departing from the spirit thereof, it is intended that all the matter contained in the above description or shown in the accompanying drawing, shall be considered as illustrative, and not in a limiting sense.

I claim as my invention:

1. A thermal protective system for a gaseous discharge device disposed to effect the energization of a load circuit by impulses of current from an alternating current source and whereon the heating effect is a particular function of the current impulses carried by the device more nearly proportional to the average value than to the root-mean-square value of said current impulses comprising, a thermal responsive device, means producing unidirectional control current impulses proportional to the load current impulses, and circuit means including a reactance energy storing device associating the thermal responsive device with the aforesaid means, operable to so modify the wave form of the control current impulses as to produce a heating effect more nearly proportional to the average value than the root-mean-square value of the load current for effecting operation of the thermal responsive device.

2. An overload protective system for a vapor discharge switch device connected for intermittently energizing a load circuit with impulses of current from an alternating-current source comprising, thermally operable means for effecting disconnection of the vapor switch device from the source and circuit means for producing relatively flat-topped current impulses substantially proportional to the average value of the load current impulses for controlling operation of the thermally operable means.

3. A protective system for a gaseous discharge device connected to an alternating-current source for intermittently energizing a load circuit with impulses of current therefrom during predetermined portions of cycles comprising, switch means operable to disconnect the gaseous discharge device from the source, thermally responsive means operable to control the operation of the switch means, and circuit means including a condenser for associating the thermally responsive means with the load circuit to produce control current impulses having a wave form so modified as to effect operation of the thermally responsive means substantially in accordance with the average value of the load current impulses.

4. A thermal protective system for an arc discharge switch device controlling the connection of a load circuit to an alternating-current source during predetermined portions of the current cycle comprising, thermally responsive switch means operable to effect disconnection of the arc discharge switch device from the source, means including a unidirectional current device associated with the load circuit for producing a unidirectional current proportional to the load current, and adjustable circuit means including a variable condenser for controlling the heating effect of the said current on the thermal device for effecting operation thereof in accordance with a predetermined heating effect of the load current.

5. A thermal overload protective system for a vapor discharge switch device for intermittently connecting a load circuit to an alternating-current source for predetermined variable intervals of time comprising, thermally responsive switch means for effecting disconnection of the vapor switch device from the source, a control circuit including a unidirectional current device for producing a unidirectional current proportional to the load current for effecting energization of the thermally responsive switch means, and means including a condenser connected with the control circuit for storing surges of electrical energy to effect operation of the thermally responsive means in accordance with predetermined heating effects of the load current.

6. An overload protective system for an arc discharge valve for connecting a load circuit to an alternating-current source for a predetermined variable number of cycles and then disconnecting it therefrom for a predetermined variable number of cycles comprising, switch means operable to disconnect the arc discharge valve from the source, thermally responsive means actuable to effect the operation of the switch means, circuit means including a transformer connected to the load circuit and a unidirectional current device for producing a control current responsive to the load current for actuating the thermally responsive means, a condenser connected in shunt relation with the thermally responsive means, and adjustable means for varying the rate of charge and discharge of the condenser to assimilate different heating effects of the load current.

EDWIN H. VEDDER.